United States Patent
Kim et al.

(10) Patent No.: US 11,799,129 B2
(45) Date of Patent: Oct. 24, 2023

(54) SOLID ION CONDUCTOR COMPOUND, SOLID ELECTROLYTE INCLUDING THE SAME, ELECTROCHEMICAL CELL INCLUDING THE SAME, AND METHOD OF PREPARING THE SAME

(71) Applicant: Samsung SDI Co., Ltd., Yongin-si (KR)

(72) Inventors: Hyunseok Kim, Suwon-si (KR); Soyeon Kim, Suwon-si (KR); Shintaro Kitajima, Hwaseong-si (KR)

(73) Assignee: SAMSUNG SDI CO., LTD., Gyeonggi-Do (KR)

(*) Notice: Subject to any disclaimer, the term of this patent is extended or adjusted under 35 U.S.C. 154(b) by 214 days.

(21) Appl. No.: 17/195,889

(22) Filed: Mar. 9, 2021

(65) Prior Publication Data

US 2021/0305623 A1    Sep. 30, 2021

(30) Foreign Application Priority Data

Mar. 27, 2020    (KR) .................. 10-2020-0037789

(51) Int. Cl.
*H01M 10/0562* (2010.01)
*H01M 4/38* (2006.01)
*H01M 4/583* (2010.01)

(52) U.S. Cl.
CPC ....... *H01M 10/0562* (2013.01); *H01M 4/382* (2013.01); *H01M 4/583* (2013.01); *H01M 2300/008* (2013.01)

(58) Field of Classification Search
CPC .. H01M 10/0562; H01M 4/382; H01M 4/583; H01M 2300/008; H01M 4/405; H01M 4/587; H01M 4/134; H01M 10/052; C01B 25/14; H01B 1/06; H01B 1/10
See application file for complete search history.

(56) References Cited

U.S. PATENT DOCUMENTS

| | | | |
|---|---|---|---|
| 10,879,562 B2 | 12/2020 | Kim et al. | |
| 2017/0187066 A1 | 6/2017 | Tsujimura et al. | |
| 2019/0260065 A1 | 8/2019 | Yashiro et al. | |
| 2020/0381772 A1* | 12/2020 | Kim ................. | H01M 10/0562 |

(Continued)

FOREIGN PATENT DOCUMENTS

| | | |
|---|---|---|
| CN | 108238616 A | 7/2018 |
| JP | 2017117635 A | 6/2017 |
| KR | 1020180076132 A | 7/2018 |

(Continued)

OTHER PUBLICATIONS

International Search Report dated Jul. 5, 2021 of PCT Patent Application No. PCT/KR2021/003661.

(Continued)

*Primary Examiner* — Stewart A Fraser
(74) *Attorney, Agent, or Firm* — CANTOR COLBURN LLP

(57) ABSTRACT

A solid ion conductor compound includes lithium (Li), phosphorus (P), hafnium (Hf), and sulfur (S), wherein if oxygen (O) is present, a content of the O is less than an amount of the Hf, and wherein the solid ion conductor compound has an argyrodite crystal structure, and in the argyrodite crystal structure the Hf is on a portion of the P crystallographic sites.

25 Claims, 7 Drawing Sheets

(56) References Cited

U.S. PATENT DOCUMENTS

2021/0094824 A1    4/2021    Lee et al.

FOREIGN PATENT DOCUMENTS

| KR | 101952196 B1 | 2/2019 |
| KR | 1020190100078 A | 8/2019 |
| KR | 1020210037540 A | 4/2021 |
| WO | 2019135321 A1 | 7/2019 |

OTHER PUBLICATIONS

Marvin A. Kraft et al., "Influence of Lattice Polarizability on the Ionic Conductivity in the Lithium Superionic Argyrodites Li6PS5X (X=Cl, Br, I)," Journal of the American Chemical Society, Jul. 25, 2017, pp. 10909-10918, vol. 139.

Yizhou Zhu et al., "Origin of Outstanding Stability in the Lithium Solid Electrolyte Materials: Insights from Thermodynamic Analyses Based on First-Principles Calculations," ACS Applied Materials & Interfaces, Oct. 6, 2015, pp. 23685-23693, vol. 7.

\* cited by examiner

SOLID ION CONDUCTOR COMPOUND, SOLID ELECTROLYTE INCLUDING THE SAME, ELECTROCHEMICAL CELL INCLUDING THE SAME, AND METHOD OF PREPARING THE SAME

CROSS-REFERENCE TO RELATED APPLICATION

This application claims priority to and the benefit of Korean Patent Application No. 10-2020-0037789, filed on Mar. 27, 2020, in the Korean Intellectual Property Office, and all the benefits accruing therefrom under 35 U.S.C. § 119, the content of which is incorporated herein in its entirety by reference.

BACKGROUND

1. Field

The present disclosure relates to a solid ion conductor compound, a solid electrolyte including the solid ion conductor compound, a lithium battery including the solid ion conductor compound, and a method of preparing the solid ion conductor compound.

2. Description of Related Art

All-solid lithium batteries include a solid electrolyte as an electrolyte. All-solid batteries do not include a flammable organic solvent and thus are stable.

Commercially available solid electrolyte materials are not sufficiently stable in the presence of lithium metal and are highly reactive with moisture, and thus deteriorate in the atmosphere. Also, lithium-ion conductivity of a commercially available solid electrolyte is lower than that of a liquid electrolyte. Thus an improved solid electrolyte material is needed.

SUMMARY

Provided is a solid ion conductor compound having improved lithium ion conductivity, improved stability in the presence of lithium metal, and improved moisture stability by having a novel composition to which hafnium (Hf) is introduced.

Provided is a solid electrolyte including the solid ion conductor compound.

Provided is an electrochemical cell including the solid ion conductor compound.

Provided is a method of preparing the solid ion conductor compound.

Additional aspects will be set forth in part in the description which follows and, in part, will be apparent from the description.

According to an aspect, a solid ion conductor compound includes: lithium (Li), phosphorus (P), hafnium (Hf), and sulfur (S), wherein if oxygen (O) is present, a content of the O is less than an amount of the Hf, and wherein the solid ion conductor compound has an argyrodite crystal structure, and in the argyrodite crystal structure the Hf is on a portion of the P crystallographic sites.

According to an aspect, an electrochemical cell includes:
a cathode layer including a cathode active material layer;
an anode layer including an anode active material layer; and
an electrolyte layer disposed between the cathode layer and the anode layer, wherein at least one of the cathode active material layer or the electrolyte layer includes the solid ion conductor compound.

According to an aspect, a method of preparing a solid ion conductor compound includes:
contacting a compound including Li, a compound including Hf, a compound including P, and a compound including S to provide a mixture; and
heat-treating the mixture at a temperature of about 400° C. to about 700° C. in an atmosphere including an inert gas to provide a solid ion conductor compound.

According to an aspect, a solid electrolyte includes:
a solid ion conductor compound represented by Formula 1, Formula 1

wherein, in Formula 1,
X is at least one of a Group 17 element,
M1 is at least one of a Group 1 element, a Group 2 element, or a Group 11 element, wherein M1 is not Li,
M2 is at least one of a Group 4 element, a Group 5 element, a Group 6 element, a Group 14 element, or a Group 15 element, wherein M2 is not Hf, N, or P, and
$4 \leq a \leq 8$, $0 \leq b < 1$, $0 \leq c < 1$, $0 < d < 1$, $0 < e < 1$, $0 < f < 5$, and $0 \leq g < 1$; and
at least one of a lithium sulfide, a silicon sulfide, a phosphorus sulfide, or a boron sulfide.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
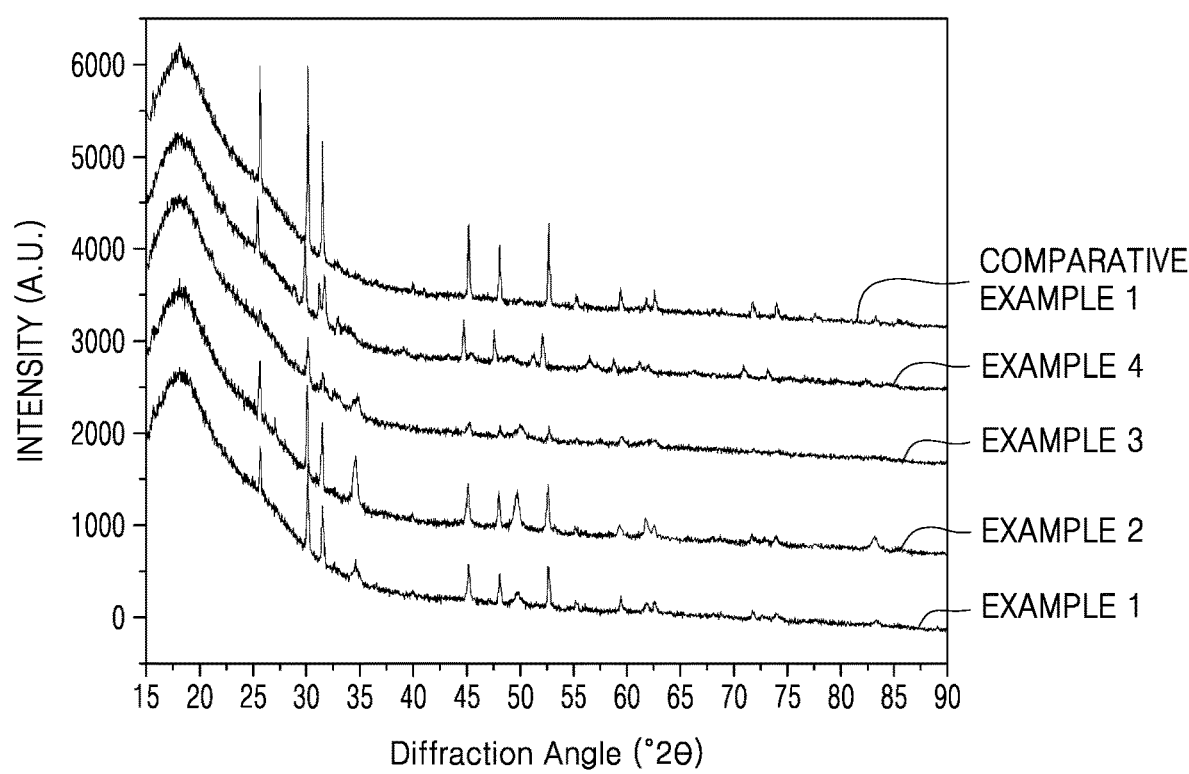
FIG. 1 is a graph of intensity (arbitrary units, a.u.) versus diffraction angle (°2θ) of solid ion conductor compounds prepared in Examples 1 to 4, when measured by powder X-ray diffraction using CuKα radiation.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Various example embodiments will now be described more fully with reference to the accompanying drawings. This inventive concept may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art.

It will be understood that when a component is referred to as being "on" another component, the component can be directly on the other component or intervening components may be present thereon. In contrast, when a component is referred to as being "directly on" another component, an intervening component is not present therebetween.

While such terms as "first," "second," "third," etc., may be used to describe various elements, components, regions, layers, and/or sections, such elements, components, regions, layers, and/or sections must not be limited to the above terms. The above terms are used only to distinguish one element, component, region, layer, or section from another element, component, region, layer, or section. Therefore, a first element, component, region, layer, or section described hereinafter may be referred to as a second element, component, region, layer, or section without departing from the teachings of the present specification.

The terms used in the present specification are merely used to describe particular embodiments, and are not intended to limit the inventive concept. An expression used in the singular encompasses the expression of the plural including "at least one", unless it has a clearly different meaning in the context. The term "at least one" should not be understood as limiting to the singular. As used herein, the term "and/or" includes any and all combinations of one or more of the associated list items. It will be further understood that the terms "includes," "comprises," "including," and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," and "upper," may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations), and the spatially relative descriptors used herein may be interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments are described herein with reference to cross-sectional illustrations that are schematic illustrations of idealized example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, a region illustrated or described as flat may, typically, have rough and/or nonlinear features. Moreover, angles illustrated as sharp may be rounded. Thus, the regions illustrated in the figures are schematic in nature and their shapes are not intended to illustrate the actual shape of a region and are not intended to limit the scope of the present description.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

"Group" refers to a group of the periodic table of the elements according to the International Union of Pure and Applied Chemistry ("IUPAC") Groups 1-18 group classification system.

While particular embodiments are described, alternatives, modifications, variations, improvements, and substantial equivalents that are or may be presently unforeseen or unexpected may arise to applicants or those skilled in the art.

Accordingly, the appended claims as filed and as they may be amended are intended to embrace all such alternatives, modification, variations, improvements, and substantial equivalents.

Hereinafter, according to one or more embodiments, a solid ion conductor compound, a solid electrolyte including the solid ion conductor compound, an electrochemical cell including the solid ion conductor compound, and a method of preparing the solid ion conductor compound will be described in detail.

Solid Ion Conductor Compound

According to an embodiment, a solid ion conductor compound includes the elements lithium (Li), phosphorus (P), hafnium (Hf), and sulfur (S), wherein if O is present, a content of the O is less than an amount of the Hf, and wherein the solid ion conductor compound has an argyrodite crystal structure, and in the argyrodite crystal structure the Hf is on a portion of the P crystallographic sites.

According to an embodiment, the solid ion conductor compound includes O in the compound at a content at least about 10 times less than a content of Hf, for example, the O content may be 100 times less than the Hf content. In an embodiment, the solid ion conductor compound does not include O, i.e., O is not detectable in the solid ion conductor compound.

When a portion of the P is substituted with Hf in the argyrodite crystal structure, i.e., a portion of the P sites in the argyrodite structure comprise the Hf, a crystal lattice volume may increase. When the crystal lattice volume increases, migration of lithium ions in a crystal lattice may be facilitated.

Also, as will be further described later, when the solid ion conductor compound according to an embodiment does not include oxygen (O) in a crystal lattice, an ion conductivity of the solid ion conductor may be high due to the high polarizability of sulfur (S) with respect to oxygen (O).

In an embodiment, the solid ion conductor compound may have diffraction peaks at diffraction angles of (°2 theta (θ)), 15.42°±0.50°, 17.87°±0.50°, 25.48°±0.50°, 30.01°±0.50°, and 31.38°±0.50°, in an X-ray diffraction (XRD) spectrum when analyzed using CuKα radiation. When the solid ion conductor compound has an argyrodite structure, the solid ion conductor compound may have these peaks in the XRD spectrum, when analyzed using CuKα radiation.

The diffraction angle corresponding to a tetrahedral crystal structure composed of the element P and the element S in the XRD spectrum, when analyzed using CuKα radiation is about 31.38°±0.50°, and the diffraction peak may appear as two peaks separated at 31.28°±0.50° and 31.72°±0.50°.

A full-width at half maximum (FWHM) of a peak of the solid ion conductor compound at a diffraction angle 2θ, 25.48°±0.50°, corresponding to a tetrahedral crystal structure composed of the element Hf and the element S in the XRD spectrum, when analyzed using CuKα radiation may be 25.48°±about 0.30° or less, 25.48°±about 0.28° or less, 25.48°±about 0.26° or less, 25.48°±about 0.24° or less, 25.48°±about 0.22° or less, 25.48°±about 0.20° or less, 25.48°±about 0.18° or less, 25.48°±about 0.16° or less, 25.48°±about 0.14° or less, 25.48°±about 0.12° or less, or 25.48°±about 0.10° or less. For example, the FWHM of a peak of the solid ion conductor compound corresponding to a tetrahedral crystal structure composed of the element Hf and the element S in the XRD spectrum, when analyzed using CuKα radiation may be at a diffraction angle 2θ at 25.48°±0.50°, 25.48°±0.45°, 25.48°±0.40°, 25.48°±0.35°, 25.48°±0.30°, 25.48°±0.25°, 25.48°±0.20°, 25.48°±0.15°, 25.48°±0.10°, 25.48°±0.05°, or 25.48°±0°. When the solid ion conductor compound has the FWHM within these ranges, an ion conductivity of the solid ion conductor compound may improve.

In an embodiment, the solid ion conductor compound may include at least one halogen element. While not wanting to be bound by theory, it is understood that the halogen element blocks displacement of cations by attracting the cations with an electrostatic attractive force, and thus collapse of the crystal structure may be suppressed. When the halogen element replaces a portion of the element S of the solid ion conductor compound, the halogen element having a relatively high electronegativity attracts cations more strongly than the S anions, and thus collapse of the crystal may be effectively prevented. As a result, reactivity with moisture may be lowered, and oxidation stability of the solid ion conductor compound may improve.

In an embodiment, the solid ion conductor compound may include the element nitrogen (N). The N is an element having a high electronegativity. While not wanting to be bound by theory, nitrogen is understood to have a similar in-crystal function as the halogen element, as is further described above. Thus inclusion of nitrogen may effectively prevent collapse of the crystal structure, and as a result, oxidation stability of the solid ion conductor compound may improve.

In an embodiment, the solid ion conductor compound may include at least one of a Group 1 element, a Group 2 element, a Group 4 element, a Group 5 element, a Group 6 element, a Group 11 element, a Group 14 element, or a Group 15 element of the periodic table in addition to Li, P, S, and Hf. For example, the solid ion conductor compound may include the element N. Due to the introduction of the additional element, an ion conductivity of lithium ions in the compound may improve, and activation energy of the compound may decrease.

In an embodiment, the solid ion conductor compound may be represented by Formula 1:

$$Li_aM1_bM2_cP_dHf_eS_{6-f-g}N_gX_f \quad \text{Formula 1}$$

wherein, in Formula 1,

X is at least one of a Group 17 element;

M1 is at least one of a Group 1 element, a Group 2 element, or a Group 11 element, wherein M1 is not Li;

M2 is at least one of a Group 4 element, a Group 5 element, a Group 5 element, a Group 14 element, or a Group 15 element, wherein M2 is not Hf, N, or P, and $4 \leq a \leq 8$, $0 \leq b < 1$, $0 \leq c < 1$, $0 < d < 1$, $0 < e < 1$, $0 < f < 6$, and $0 \leq g < 1$. For example, $5 \leq a \leq 7$, $0 \leq b < 0.5$, $0 \leq c < 0.5$, $0 < d < 1$, $0 < e \leq 0.5$, $0 < f \leq 4$, and $0 \leq g < 0.5$. For example, $5.5 \leq a \leq 7$, $0 \leq b < 0.5$, $0 \leq c < 0.5$, $0 < d < 1$, $0 < e \leq 0.5$, $0 < f \leq 2$, and $0 \leq g < 0.3$. For example, $5.5 \leq a \leq 7$, $0 \leq b < 0.5$, $0 \leq c < 0.5$, $0 < d < 1$, $0 < e \leq 0.5$, $1 < f \leq 3$, and $0 \leq g < 0.2$.

The compound represented by Formula 1 may be, for example, a crystalline compound having an argyrodite crystal structure. When the compound includes Hf substituted in a portion of the P sites in the crystal structure, an ion conductivity of lithium ions in the compound may improve, and activation energy of lithium ion in the compound may decrease. In an embodiment, a crystal lattice volume may increase by arranging ions having an ion radius larger than P ions in a part of the P sites included in the solid ion conductor compound represented by Formula 1. When the crystal lattice volume increases, migration of lithium ions in the crystal lattice may be facilitated.

In an embodiment, M1 in the solid ion conductor compound represented by Formula 1 may include, for example, at least one of Na, K, Rb, Cs, Fr, Mg, Ca, Sr, Ba, Ra, Cu, Ag, or Au.

In an embodiment, M2 in the solid ion conductor compound represented by Formula 1 may include, for example, at least one of Si, Ge, As, Sb, Bi, Sn, Pb, V, Nb, Ta, Cr, Mo, W, Ti, or Zr.

In an embodiment, X in the solid ion conductor compound represented by Formula 1 may be at least one of F, Cl, Br, or I.

In an embodiment, d and e in the solid ion conductor compound represented by Formula 1 may satisfy $0 < e/(d+e) < 0.5$. When a ratio of d and e satisfies this range, a lithium ion conductivity of the solid ion conductor compound may improve In an embodiment, b and c in the solid ion conductor compound represented by Formula 1 may both be 0.

In an embodiment, b, c, and g in the solid ion conductor compound represented by Formula 1 may all be 0.

In an embodiment, the solid ion conductor compound may be represented by Formula 2:

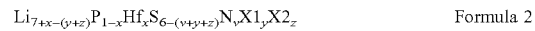

$$Li_{7+x-(y+z)}P_{1-x}Hf_xS_{6-(v+y+z)}N_vX1_yX2_z \quad \text{Formula 2}$$

wherein, in Formula 2,

X1 and X2 may each independently be at least one of F, Cl, Br, or I; and $0 < x \leq 0.5$, $0 < y < 2$, $0 < z < 2$, and $0 \leq v < 1$. For example, $0 < x \leq 0.5$, $0 < x \leq 0.5$, $0 < y < 2$, $0 < z < 2$, and $0 \leq v < 0.5$. For example, $0<x\leq0.5$, $0<x\leq0.5$, $0<y<2$, $0<z<2$, and $0\leq v<0.3$. For example, $0<x\leq0.5$, $0<x\leq0.5$, $0<y<2$, $0<z<2$, and $0\leq v<0.2$.

In an embodiment, in the solid ion conductor compound represented by Formula 2, X1 may be Cl; X2 may be at least one of CI or Br; and $0<y+z\leq2$.

The solid ion conductor compound represented by Formula 1 may be, for example, at least one of

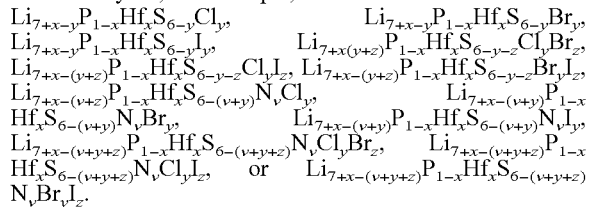

$Li_{7+x-y}P_{1-x}Hf_xS_{6-y}Cl_y$, $Li_{7+x-y}P_{1-x}Hf_xS_{6-y}Br_y$, $Li_{7+x-y}P_{1-x}Hf_xS_{6-y}I_y$, $Li_{7+x(y+z)}P_{1-x}Hf_xS_{6-y-z}Cl_yBr_z$, $Li_{7+x-(y+z)}P_{1-x}Hf_xS_{6-y-z}Cl_yI_z$, $Li_{7+x-(y+z)}P_{1-x}Hf_xS_{6-y-z}Br_yI_z$, $Li_{7+x-(v+z)}P_{1-x}Hf_xS_{6-(v+y)}N_vCl_y$, $Li_{7+x-(v+y)}P_{1-x}Hf_xS_{6-(v+y)}N_vBr_y$, $Li_{7+x-(v+y)}P_{1-x}Hf_xS_{6-(v+y)}N_vI_y$, $Li_{7+x-(v+y+z)}P_{1-x}Hf_xS_{6-(v+y+z)}N_vCl_yBr_z$, $Li_{7+x-(v+y+z)}P_{1-x}Hf_xS_{6-(v+y+z)}N_vCl_yI_z$, or $Li_{7+x-(v+y+z)}P_{1-x}Hf_xS_{6-(v+y+z)}N_vBr_yI_z$.

In these formulae, x, y, z, and v may each independently be $0<x\leq0.5$, $0<y<2$, $0<z<2$, and $0<v<1$.

Examples of the solid ion conductor compound represented by Formula 1 may be at least one of

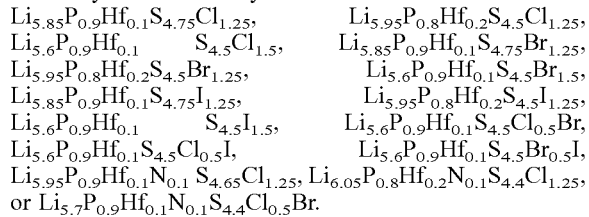

$Li_{5.85}P_{0.9}Hf_{0.1}S_{4.75}Cl_{1.25}$, $Li_{5.95}P_{0.8}Hf_{0.2}S_{4.5}Cl_{1.25}$, $Li_{5.6}P_{0.9}Hf_{0.1}S_{4.5}Cl_{1.5}$, $Li_{5.85}P_{0.9}Hf_{0.1}S_{4.75}Br_{1.25}$, $Li_{5.95}P_{0.8}Hf_{0.2}S_{4.5}Br_{1.25}$, $Li_{5.6}P_{0.9}Hf_{0.1}S_{4.5}Br_{1.5}$, $Li_{5.85}P_{0.9}Hf_{0.1}S_{4.75}I_{1.25}$, $Li_{5.95}P_{0.8}Hf_{0.2}S_{4.5}I_{1.25}$, $Li_{5.6}P_{0.9}Hf_{0.1}S_{4.5}I_{1.5}$, $Li_{5.6}P_{0.9}Hf_{0.1}S_{4.5}Cl_{0.5}Br$, $Li_{5.6}P_{0.9}Hf_{0.1}S_{4.5}Cl_{0.5}I$, $Li_{5.6}P_{0.9}Hf_{0.1}S_{4.5}Br_{0.5}I$, $Li_{5.95}P_{0.9}Hf_{0.1}N_{0.1}S_{4.65}Cl_{1.25}$, $Li_{6.05}P_{0.8}Hf_{0.2}N_{0.1}S_{4.4}Cl_{1.25}$, or $Li_{5.7}P_{0.9}Hf_{0.1}N_{0.1}S_{4.4}Cl_{0.5}Br$.

Solid Electrolyte

According to an embodiment, a solid electrolyte includes the solid ion conductor compound represented by Formula 1. When the solid electrolyte includes the solid ion conductor compound, the solid electrolyte may have a high ion conductivity and a high chemical stability. The solid electrolyte including the solid ion conductor compound represented by Formula 1 may provide improved stability with respect to air and improved electrochemical stability with respect to lithium metal. Therefore, the solid ion conductor compound represented by Formula 1 may be, for example, used as a solid electrolyte of an electrochemical cell.

The solid electrolyte may further include an additional solid electrolyte in addition to the solid ion conductor compound represented by Formula 1. For example, the solid electrolyte may comprise a sulfide-based solid electrolyte and/or oxide-based solid electrolyte. The additionally included solid ion conductor compound may be, for example, at least one of $Li_2O$—$Al_2O_3$—$TiO_2$—$P_2O_5$ (LATP), $Li_{2+2x}Zn_{1-x}GeO_4$ wherein $0<x<1$ (Lithium Super Ionic Conductor, LISICON), $Li_{3-y}PO_{4-x}N_x$ (LIPON, where $0<y<3$ and $0<x<4$), $Li_{3.25}Ge_{0.25}P_{0.75}S_4$(Thio-LISICON), $Li_2S$, $Li_2S$ $P_2S_5$, $Li_2S$—$SiS_2$, $Li_2S$—$GeS_2$, $Li_2S$—$B_2S_5$, or $Li_2S$—$Al_2S_5$, but embodiments are not limited thereto, and any suitable solid ion conductor compound may be used.

The solid electrolyte may have any suitable shape, and may be in a powder form or a form from a mold. The solid electrolyte in a mold form may be, for example, in the form of a pellet, a sheet, or a thin film, but embodiments are not limited thereto, and the solid electrolyte may be in various forms according to its use.

Electrochemical Cell

According to an embodiment, an electrochemical cell includes a cathode layer including a cathode active material layer; an anode layer including an anode active material layer; and an electrolyte layer disposed between the cathode layer and the anode layer, wherein the cathode active material layer and/or electrolyte layer include the solid ion conductor compound represented by Formula 1. When the electrochemical cell includes the solid ion conductor compound represented by Formula 1, a lithium ion conductivity and stability with respect to lithium metal of the electrochemical cell may improve.

The electrochemical cell may be, for example, an all-solid secondary battery, a liquid electrolyte-containing secondary battery, or a lithium air battery, but embodiments are not limited thereto, and any suitable electrochemical cell may be used. The all-solid secondary battery may have a vapor pressure of less than about 2 atmospheres, preferably less than about 1 atmosphere, at room temperature (25° C.). For example, the vapor pressure in the all-solid battery may be between 0 and about 2 atmospheres, between about $1\times10^{-6}$ atmosphere to about 1 atmosphere, between about $1\times10^{-6}$ atmosphere to about 0.9 atmosphere, between about $1\times10^{-4}$ atmosphere to about 0.8 atmosphere, between about $1\times10^{-3}$ atmosphere to about 0.7 atmosphere, between about $1\times10^{-2}$ atmosphere to about 0.6 atmosphere, or between about $1\times10^{-1}$ atmosphere to about 0.5 atmosphere.

Hereinafter, an all-solid secondary battery will be described in detail.

All-Solid Secondary Battery: First Type

The all-solid secondary battery may include the solid ion conductor compound represented by Formula 1.

For example, the all-solid secondary battery may include a cathode layer including a cathode active material layer; an anode layer including an anode active material layer; and an electrolyte layer disposed between the cathode layer and the anode layer, wherein the cathode active material layer and/or electrolyte layer may include the solid ion conductor compound represented by Formula 1.

The all-solid secondary battery according to an embodiment may be prepared as described herein.

Solid Electrolyte Layer

First, a solid electrolyte layer is prepared.

The solid electrolyte layer may be prepared by mixing and drying the solid ion conductor compound represented by Formula 1 and a binder or by roll-pressing a powder of the solid ion conductor compound represented by Formula 1 with a pressure in a range of about 1 ton to about 10 tons in a desired shape. The solid ion conductor compound represented by Formula 1 is used as a solid electrolyte.

An average particle diameter of the solid electrolyte may be, for example, in a range of about 0.5 µm to about 20 µm, about 1 µm to about 15 µm, about 2 µm to about 10 µm, or about 4 µm to about 8 µm. When a particle diameter of the solid electrolyte is within this range, a bonding property in the process of forming a sintered body improves, and thus an ion conductivity and cycle characteristics of the solid electrolyte particles may improve.

A thickness of the solid electrolyte layer may be in a range of about 10 µm to about 200 µm, about 15 µm to about 175 µm, about 30 µm to about 150 µm, about 50 µm to about 125 µm, or about 75 µm to about 100 µm. When a thickness of the solid electrolyte layer is within this range, a migration rate of lithium ions is improved, which may result in high ion conductivity.

The solid electrolyte layer may further include a solid electrolyte such as a sulfide-based solid electrolyte and/or oxide-based solid electrolyte in addition to the solid ion conductor compound represented by Formula 1.

Examples of the sulfide-based solid electrolyte may include at least one of a lithium sulfide, a silicon sulfide, a phosphorus sulfide, or a boron sulfide. Examples of the sulfide-based solid electrolyte particles may include at least one of $Li_2S$, $P_2S_5$, $SiS_2$, $GeS_2$, or $B_2S_3$. Examples of the sulfide-based solid electrolyte particles may include $Li_2S$ or $P_2S_5$. The sulfide-based solid electrolyte particles are known as having a lithium ion conductivity higher than those of other inorganic compounds. When sulfide-based solid electrolyte materials constituting the sulfide-based solid electrolyte include $Li_2S$—$P_2S_5$, a mixing molar ratio of $Li_2S$ to $P_2S_5$ may be, for example, in a range of about 50:50 to about 90:10. Also, an inorganic solid electrolyte prepared by adding at least one of $Li_3PO_4$, a halogen atom, a halogen-containing compound, $Li_{2+2x}Zn_{1-x}GeO_4$ (LISICON), $Li_{3+y}PO_{4-x}N_x$ (LIPON), $Li_{3.25}Ge_{0.25}P_{0.75}S_4$(Thio-LISICON), or $Li_2O$—$Al_2O_3$—$TiO_2$—$P_2O_5$ (LATP) to an inorganic solid electrolyte comprising at least one of $Li_2S$—$P_2S_5$, $SiS_2$, $GeS_2$ or $B_2S_3$ may be used as the sulfide-based solid electrolyte. Examples of the sulfide-based solid electrolyte materials may include at least one of $Li_2S$—$P_2S_5$; $Li_2S$—$P_2S_5$—LiX (where X is a halogen element); $Li_2S$—$P_2S_5$—$Li_2O$; $Li_2S$—$P_2S_5$—$Li_2O$—LiI; $Li_2S$—$SiS_2$; $Li_2S$—$SiS_2$—LiI; $Li_2S$—$SiS_2$-Liar; $Li_2S$—$SiS_2$—LiCl, $Li_2S$—$SiS_2$—$B_2S_3$—LiI; $Li_2S$—$SiS_2$—$P_2S_5$—LiI, $Li_2S$—$B_2S_3$; $Li_2S$—$P_2S_5$—$Z_mS_n$ (where m and n are each a positive integer, and Z is Ge, Zn, or G); $Li_2S$—$GeS_2$; $Li_2S$—$SiS_2$—$Li_3PO_4$; or $Li_2S$—$SiS_2$-$Li_pMO_q$ (where p and q are each a positive integer, and M is P, Si, Ge, B, Al, Ga, or In). In this regard, the sulfide-based solid electrolyte materials may be prepared by treating raw starting materials (e.g., $Li_2S$ or $P_2S_5$) of the sulfide-based solid electrolyte materials by using a melt quenching method or a mechanical milling method. Also, a calcination process may follow the treatment.

Examples of a binder included in the solid electrolyte layer may include at least one of styrene butadiene rubber (SBR), polytetrafluoroethylene, polyvinylidene fluoride, polyethylene, or polyvinyl alcohol, but embodiments are not limited thereto, and any suitable binder may be used. The binder of the solid electrolyte layer may be identical to or different from a binder of the cathode layer and the anode layer.

Cathode Layer

The cathode layer may be prepared by forming a cathode active material layer including a cathode active material on a current collector. An average particle diameter of the cathode active material may be, for example, in a range of about 2 μm to about 10 μm, about 3 μm to about 9 μm, or about 4 μm to about 8 μm.

The cathode active material may be any suitable cathode active material. Examples of the cathode active material may include at least one of a lithium transition metal oxide or a transition metal sulfide. For example, the cathode active material may be at least one composite oxide of lithium with a metal, wherein the metal is at least one of Co, Mn, or Ni. In an embodiment, the cathode active material may be a compound represented by at least one of
$Li_aA_{1-b}B'_bD_2$ (where $0.90 \leq a \leq 1.8$ and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$, $QS_2$; $LiQS_2$; $V_2O_5$, $LiV_2O_2$; $LiI'O_2$, $Li_{(3-f)}J_2(PO_4)_3$ (where $0 \leq f \leq 2$); $Li_{(3-f)}Fe_2(PO_4)_3$ (where $0 \leq f \leq 2$); or $LiFePO_4$. In the formulae above, each A may independently be at least one of nickel (Ni), cobalt (Co), or manganese (Mn), each B' may independently be at least one of aluminum (Al), nickel (Ni), cobalt (Co), manganese (Mn), chromium (Cr), iron (Fe), magnesium (Mg), strontium (Sr), vanadium (V), or a rare earth element; each D may independently be at least one of oxygen (O), fluorine (F), sulfur (S), or phosphorus (p); each E may independently be at least one of cobalt (Co) or manganese (Mn), each F' may independently be at least one of fluorine (F), sulfur (S), or phosphorus (p); each G may independently be at least one of aluminum (Al), chromium (Cr), manganese (Mn), iron (Fe), magnesium (Mg), lanthanum (La), cerium (Ce), strontium (Sr), or vanadium (V); each Q may independently be at least one of titanium (Ti), molybdenum (Mo), or manganese (Mn), each I' may independently be at least one of chromium (Cr), vanadium (V), iron (Fe), scandium (Sc), or yttrium (Y); and each J may independently be at least one of vanadium (V), chromium (Cr), manganese (Mn), cobalt (Co), nickel (Ni), or copper (Cu). In an embodiment, the cathode active material may be at least one of $LiCoO_2$, $LiMn_xO_{2x}$ (where x is 1 or 2), $LiNi_{1-x}Mn_xO_{2x}$ (where $0<x<1$), $Ni_{1-x-y}Co_xNn_yO_2$ (where $0 \leq x \leq 0.5$ and $0 \leq y \leq 0.5$), $Ni_{1-x-y}Co_xAl_yO_2$ (where $0 \leq x \leq 0.5$ and $0 \leq y \leq 0.5$), $LiFePO_4$, $TiS_2$, $FeS_2$, $TiS_3$, or $FeS_3$. The compounds listed as cathode active materials may have a surface coating layer (hereinafter, also referred to as "coating layer"). Alternatively, a mixture of a compound without a coating layer and a compound having a coating layer, the compounds being at least one of the compounds listed above, may be used. In an embodiment, the coating layer may include, for example, a coating element compound of an oxide, a hydroxide, an oxyhydroxide, an oxycarbonate, or a hydroxycarbonate of the coating element. In an embodiment, the compounds for the coating layer may be amorphous or crystalline. In an embodiment, the coating element for the coating layer may be at least one of magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), niobium (Nb), tantalum (Ta), tungsten (W), or molybdenum (Mo). In an embodiment, the coating layer may be formed using any suitable method that does not adversely affect the physical properties of the cathode active material. For example, the coating layer may be formed using a spray coating method or a dipping method. Suitable coating methods may be well understood by one of ordinary skill in the art, and thus a detailed description thereof will be omitted.

The cathode active material may include, for example, a lithium salt of a transition metal oxide that has a layered rock-salt type structure among the examples of the lithium transition metal oxide. For example, the "layered rock-salt type structure" refers to a structure in which an oxygen atom layer and a metal atom layer are alternately and regularly arranged in a <111> direction in a cubic rock-salt type structure, where each of the atom layers forms a two-dimensional flat plane. The "cubic rock-salt type structure" refers to a sodium chloride (NaCl) type structure, which is one of a crystalline structure, in particular, in which face-centered cubic (fcc) lattices respectively formed of anions and cations are shifted by a half of the ridge of each unit lattice. Examples of the lithium transition metal oxide having the layered rock-salt type structure may include a lithium transition metal oxide, e.g., $LiNi_xCo_yAl_zO_2$ (NCA) or LiN- $Li_xCo_yMn_zO_2$ (NCM) (wherein in each of NCA and NCM, x, y, and z are independently 0<x<1, 0<y<1, 0<z<1, and x+y+z=1). When the cathode active material includes a transition metal oxide having the layered rock-salt type structure, an energy density and thermal stability of an all-solid secondary battery may improve.

The cathode active material may be covered by a coating layer as described herein. The coating layer is any suitable material that may be used as a coating layer of a cathode active material of an all-solid secondary battery. Examples of the coating layer may be $Li_2O$—$ZrO_2$ (LZO) or $LiNbO_3$.

When the cathode active material includes nickel (Ni) as a lithium transition metal oxide such as NCA or NCM, a capacity density of the all-solid secondary battery increases, and thus metal elution from the cathode active material in a charged state may be reduced. As a result, cycle characteristics of the all-solid secondary battery in a charged state improve.

A shape of the cathode active material may be, for example, a particle having a true spherical shape or having an elliptical shape. A particle diameter of the cathode active material is not particularly limited and may be in a suitable range used in a cathode active material of an all-solid secondary battery. An amount of the cathode active material of the cathode layer is not particularly limited and may be in a suitable range used in a cathode layer of an all-solid secondary battery. In the cathode active material layer, an amount of the cathode active material may be, for example, in a range of about 50 weight % to about 95 weight %, about 55 weight % to about 90 weight %, about 60 weight % to about 85 weight %, or about 65 weight % to about 80 weight %, based on a total weight of the cathode active material layer.

The cathode active material layer may include the solid ion conductor compound represented by Formula 1.

The cathode active material layer may include a binder. Examples of the binder may include at least one of styrene butadiene rubber (SBR), polytetrafluoroethylene, polyvinylidene fluoride, or polyethylene.

The cathode active material layer may include a conducting agent. Examples of the conducting agent may include at least one of graphite, carbon black, acetylene black, Ketjen black, carbon fiber, or a metal powder.

The cathode active material layer may include additives such as a filler, a coating agent, a dispersant, or an ion conducting agent, in addition to the cathode active material, solid electrolyte, binder, and conducting agent.

The filler, the dispersant, and/or the ion conducting agent that may be added to the cathode active material layer may be any suitable materials for use in an electrode of an all-solid secondary battery.

The cathode current collector may be a plate or a foil formed of, for example, at least one of aluminum (Al), indium (In), copper (Cu), magnesium (Mg), stainless steel, titanium (Ti), iron (Fe), cobalt (Co), nickel (Ni), zinc (Zn), germanium (Ge), lithium (Li), or an alloy thereof. The cathode current collector may be omitted.

The cathode current collector may include a carbon layer disposed on one surface or two surfaces of a metal substrate. When the carbon layer is additionally disposed on the metal substrate, corrosion of a metal of the metal substrate by the solid electrolyte in the cathode layer may be prevented, and an interfacial resistance between the cathode active material layer and the cathode current collector may be decreased. A thickness of the carbon layer may be, for example, in a range of about 1 μm to about 5 μm, or about 2 μm to about 4 μm. When a thickness of the carbon layer is too thin, contact between the metal substrate and the solid electrolyte may not be sufficiently blocked. When a thickness of the carbon layer is too thick, an energy density of the all-solid secondary battery may be deteriorated. The carbon layer may include amorphous carbon or crystalline carbon.

Anode Layer

Next, an anode layer is prepared.

The anode layer may be prepared in the same manner as the preparation of the cathode layer, except that an anode active material is used instead of a cathode active material. The anode layer may be prepared by forming an anode active material layer including an anode active material on an anode current collector.

The anode active material layer may include the solid ion conductor compound represented by Formula 1.

The anode active material may be at least one of a lithium metal or a lithium metal alloy.

The anode active material layer may further include an anode active material in addition to at least one of lithium metal or a lithium metal alloy. Examples of the anode active material may be at least one of a metal alloyable with lithium, a transition metal oxide, a non-transition metal oxide, or a carbonaceous material. Examples of the metal alloyable with lithium may be Ag, Si, Sn, Al, Ge, Pb, Bi, Sb, a Si—Y' alloy (where Y' is at least one of an alkali metal, an alkali earth metal, a Group 13 element, a Group 14 element, a transition metal, or a rare earth element, and Y' is not Si), and a Sn—Y' alloy (where Y' is at least one of an alkali metal, an alkali earth metal, a Group 13 element, a Group 14 element, a transition metal, or a rare earth element, and Y' is not Sn). In an embodiment, Y' may be at least one of magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), or polonium (Po). Examples of the transition metal oxide may be a lithium titanium oxide, a vanadium oxide, or a lithium vanadium oxide. Examples of the non-transition metal oxide may be $SnO_2$ or $SiO_x$ (where 0<x<2). Examples of the carbonaceous material may be crystalline carbon or amorphous carbon. Examples of the crystalline carbon may be graphite, such as natural graphite or artificial graphite that is in shapeless, plate, flake, spherical, or fibrous form. Examples of the amorphous carbon are soft carbon (carbon sintered at low temperatures), hard carbon, meso-phase pitch carbides, or sintered cokes.

Figure 5:
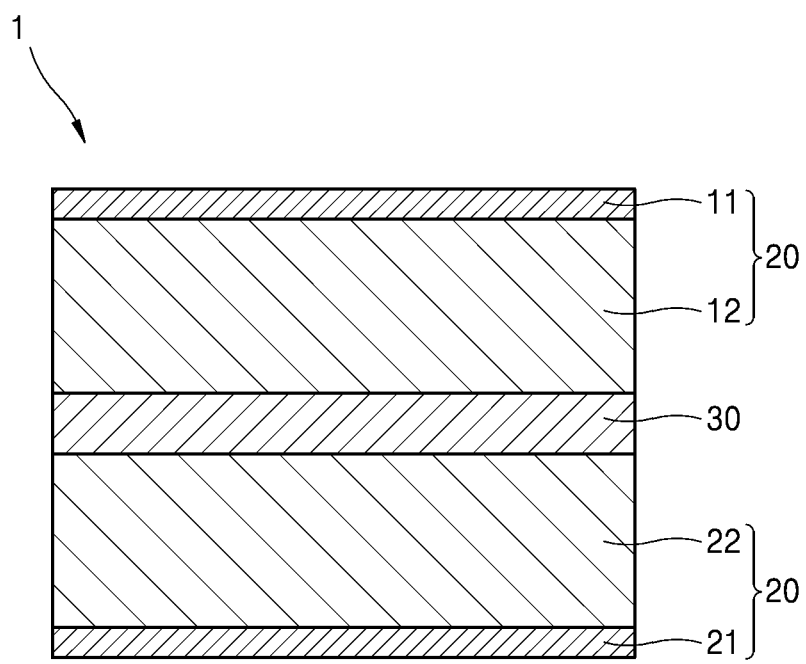
FIG. 5 is a schematic view of an embodiment of an all-solid secondary battery.

Referring to FIG. 5, an all-solid secondary battery 1 according to an embodiment includes a solid electrolyte layer 30, a cathode layer 10 disposed on one surface of the solid electrolyte layer 30, and an anode layer 20 disposed on the other surface of the solid electrolyte layer 30. The cathode layer 30 includes a cathode active material layer 12 in contact with the solid electrolyte layer 30; and a cathode current collector 11 in contact with the cathode active material layer 12, and the anode layer 20 includes an anode active material layer 22 in contact with the solid electrolyte layer 30; and an anode current collector 21 in contact with the anode active material layer 22. The all-solid secondary battery 1 may be completed, for example, by forming the cathode active material layer 12 and the anode active material layer 22 on both surfaces of the solid electrolyte layer 30; and forming the cathode current collector 11 and the anode current collector 21 on the cathode active material layer 12 and the anode active material layer 22, each respectively. In an embodiment, the all-solid secondary battery 1 may be completed by, for example, sequentially stacking the anode active material layer 22, the solid electrolyte layer 30, the cathode active material layer 12, and the cathode current collector 11 in the stated order on the anode current collector 21.

All-Solid Secondary Battery: Second Type

Figure 6:
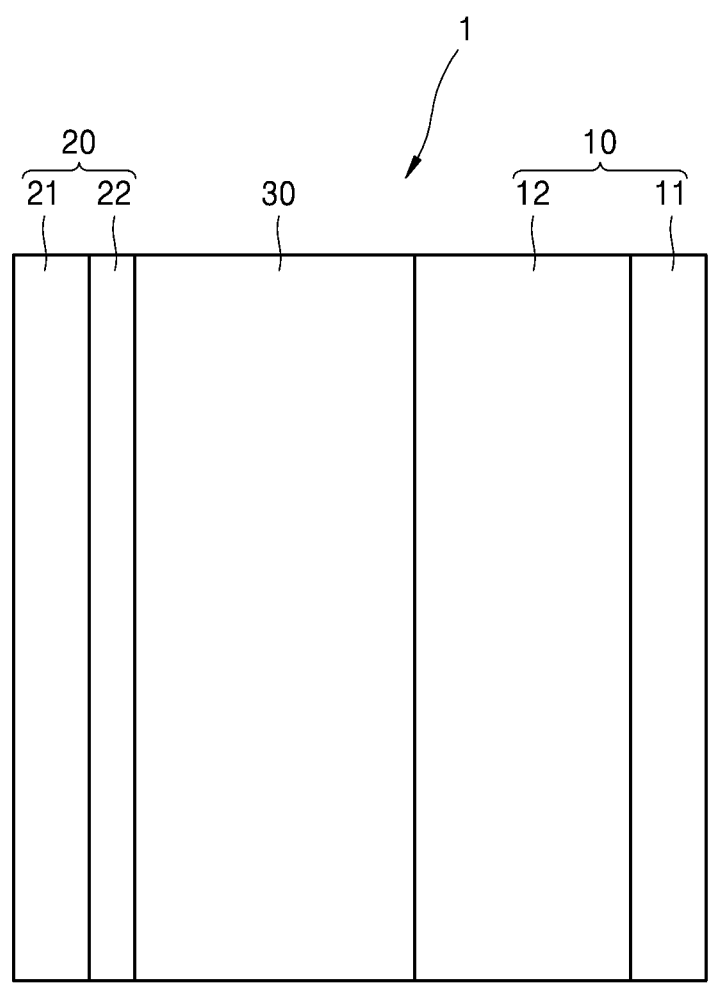
FIG. 6 is a schematic view of an embodiment of an all-solid secondary battery.
Figure 7:
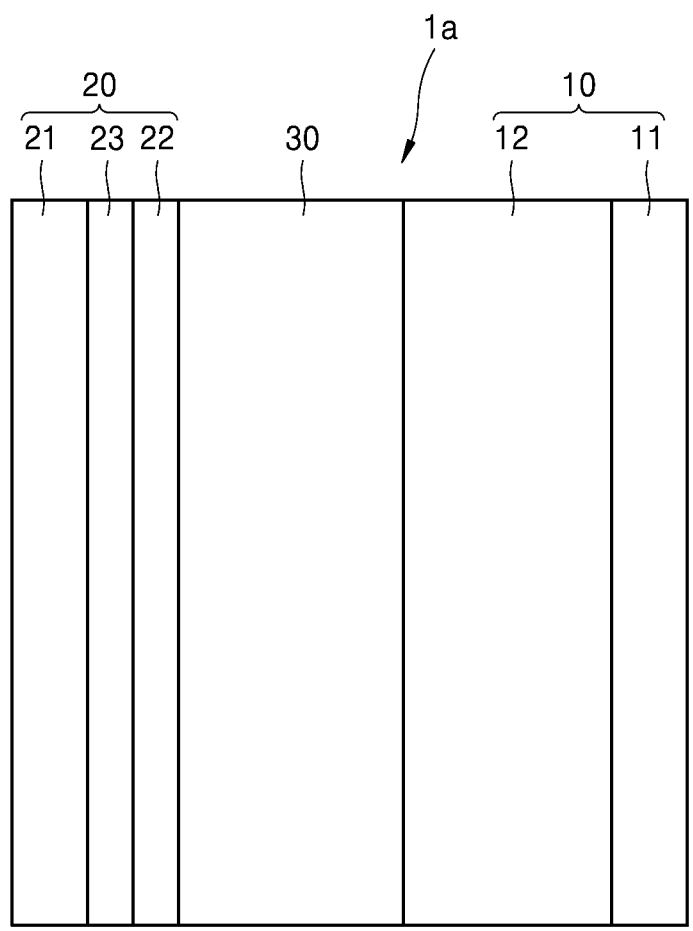
FIG. 7 is a schematic view of an embodiment of an all-solid secondary battery.

Referring to FIGS. 6 and 7, the all-solid secondary batteries 1 and 1*a* may each include, for example, a cathode layer 10 including a cathode active material layer 12 disposed on a cathode current collector 11; an anode layer 20 including an anode active material layer 22 disposed on an anode current collector 21; and an electrolyte layer 30 disposed between the cathode layer 10 and the anode layer 20, wherein the cathode active material layer 12 and/or the electrolyte layer 30 may include a solid ion conductor compound represented by Formula 1.

The all-solid secondary battery 1 according to an embodiment may be prepared as follows.

The cathode layer 10 and the solid electrolyte layer 30 are prepared in the same manner as in the all-solid secondary battery 1 as described herein.

Anode Layer

Next, the anode layer 20 is prepared.

Referring to FIGS. 6 and 7, the anode layer 20 may include an anode current collector 21 and an anode active material 22 disposed on the anode current collector 21, and the anode active material 22 may include, for example, an anode active material and a binder.

The anode active material including the anode active material layer 22 may be, for example, in the form a particle. An average particle diameter of the anode active material in the form of a particle may be, for example, about 4 μm or less, about 3 μm or less, about 2 μm or less, about 1 μm or less, or about 900 nm or less. An average particle diameter of the anode active material in the form of a particle may be, for example, in a range of about 10 nm to about 4 μm, about 10 nm to about 3 μm, about 20 nm to about 2 μm, about 40 nm to about 1 μm, or about 80 nm to about 900 nm. When the average particle diameter of the anode active material is within these ranges, reversible absorbing and/or desorbing of lithium during charge/discharge may be facilitated. The average particle diameter of the anode active material may be, for example, a median diameter (D50) measured by using a laser diffraction particle diameter distribution meter.

The anode active material in the anode active material layer 22 may include, for example, at least one of a carbonaceous anode active material, a metal anode active material, or a metalloid anode active material.

The carbonaceous anode active material may be, for example, particularly, amorphous carbon. Examples of the amorphous carbon may be carbon black (CB), acetylene black (AB), furnace black (FB), Ketjen black (KB), or graphene, but embodiments are not limited thereto, and any suitable amorphous carbon may be used. The amorphous carbon refers to carbon that has no crystallinity or a very low crystallinity, which may be different from crystalline carbon or graphite carbon.

For example, the metal or metalloid anode active material may include at least one of gold (Au), platinum (Pt), palladium (Pd), silicon (Si), silver (Ag), aluminum (Al), bismuth (Bi), tin (Sn), or zinc (Zn), but embodiments are not limited thereto, and any suitable metal anode active material or metalloid anode active material, capable of forming an alloy or a compound with lithium, may be used. For example, nickel (Ni) does not form an alloy with lithium and thus is not a metal anode active material.

The anode active material layer 22 may include one anode active material or may include a mixture of different anode active materials. For example, the anode active material layer 22 may only include amorphous carbon or may include at least one of gold (Au), platinum (Pt), palladium (Pd), silicon (Si), silver (Ag), aluminum (Al), bismuth (Bi), tin (Sn), or zinc (Zn). In an embodiment, the anode active material layer 22 may include a mixture including amorphous carbon and at least one of gold (Au), platinum (Pt), palladium (Pd), silicon (Si), silver (Ag), aluminum (Al), bismuth (Bi), tin (Sn), or zinc (Zn). A mixing ratio of the amorphous carbon to gold may be a weight ratio in a range of about 10:1 to about 1:2, about 5:1 to about 1:1, or about 4:1 to about 2:1, but embodiments are not limited thereto, and the mixing ratio may be selected to provide desired characteristics of the all-solid secondary battery 1. When the anode active material has the selected composition, cycle characteristics of the all-solid secondary battery 1 may improve.

The anode active material in the anode active material layer 22 may include, for example, a mixture including a first particle formed of amorphous carbon and a second particle formed of a metal or a metalloid. Examples of the metal or metalloid may be gold (Au), platinum (Pt), palladium (Pd), silicon (Si), silver (Ag), aluminum (Al), bismuth (Bi), tin (Sn), or zinc (Zn). In an embodiment, the metalloid may be a semiconductor. An amount of the second particle may be in a range of about 8 weight % to about 60 weight %, about 10 weight % to about 50 weight %, about 15 weight % to about 40 weight %, or about 20 weight % to about 30 weight %, based on the total weight of the mixture. When the amount of the second particle is within these ranges, cycle characteristics of the all-solid secondary battery 1 may improve.

Examples of the binder in the anode active material layer 22 may include at least one of styrene-butadiene rubber (SBR), polytetrafluoroethylene, polyvinylidene fluoride, polyethylene, a vinylidene fluoride/hexafluoropropylene copolymer, polyacrylonitrile, or polymethylmethacrylate, but embodiments are not limited thereto, and any suitable binder may be used. The binder may be formed of a single binder or a plurality of different binders.

When the anode active material layer 22 includes the binder, the anode active material layer 22 is stabilized on the anode current collector 21. Also, cracks of the anode active material layer 22 may be suppressed despite of volume change and/or relative location change of the anode active material layer 22 during charge/discharge. For example, when the anode active material layer 22 does not include a binder, the anode active material layer 22 may be easily separated from the anode current collector 21. When the anode active material layer 22 is detached from the anode current collector 21, a possibility of a short-circuit occurrence may increase as the anode current collector 21 contacts the solid electrolyte layer 30 at the exposed part of the anode current collector 21. The anode active material layer 22 may be prepared by, for example, coating and drying a slurry, in which materials forming the anode active material layer 22 are dispersed, on the anode current collector 21. When the binder is included in the anode active material layer 22, the anode active material may be stably dispersed in the slurry. For example, when the slurry is coated on the anode current collector 21 by using a screen printing method, clogging of the screen (e.g., clogging by an aggregate of the anode active material) may be suppressed.

The anode active material layer 22 may further include additives that are used in an all-solid secondary battery, such as a filler, a coating agent, a dispersant, and an ion conducting agent.

A thickness of the anode active material layer 22 may be, for example, about 50% or less, about 40% or less, about 30% or less, about 20% or less, about 10% or less, or about 5% or less of a thickness of the cathode active material layer 12. A thickness of the anode active material layer 22 may be, for example, about 0.1% to about 50%, about 1% to about 40%, about 5% to about 30%, or about 10% to about 20%, of a thickness of the cathode active material layer 12. For example, a thickness of the anode active material layer 22 may be in a range of about 1 μm to about 20 μm, about 2 μm to about 10 μm, or about 3 μm to about 7 μm. When the thickness of the anode active material layer 22 is too thin, lithium dendrite formed between the anode active material layer 22 and the anode current collector 21 destroys the anode active material layer 22, and thus cycle characteristics of the all-solid secondary battery 1 may not improve. When the thickness of the anode active material layer 22 is too thick, an energy density of the all-solid secondary battery 1 may be deteriorated and an oxidation-resistance of the all-solid secondary battery 1 by the anode active material layer 22 may increase, and thus cycle characteristics of the all-solid secondary battery 1 may not improve.

For example, when the thickness of the anode active material layer 22 decreases, a charge capacity of the anode active material layer 22 may decrease. The charge capacity of the anode active material layer 22 may be, for example, about 50% or less, about 40% or less, about 30% or less, about 20% or less, about 10% or less, about 5% or less, or about 2% or less of a charge capacity of the cathode active material layer 12. The charge capacity of the anode active material layer 22 may be, for example, in a range of about 0.1% to about 50%, about 0.2% to about 40%, about 0.3% to about 30%, about 0.4% to about 20%, about 0.5% to about 10%, about 0.5% to about 5%, or about 0.7% to about 2% of a charge capacity of the cathode active material layer 12. When the charge capacity of the anode active material layer 22 is too low, a thickness of the anode active material layer 22 is too thin, lithium dendrite formed between the anode active material layer 22 and the anode current collector 21 during repeated charge/discharge processes destroys the anode active material layer 22, and thus cycle characteristics of the all-solid secondary battery 1 may not improve. When the charge capacity of the anode active material layer 22 is too high, an energy density of the all-solid secondary battery 1 may be deteriorated and an internal resistance of the all-solid secondary battery 1 by the anode active material layer 22 may increase, and thus cycle characteristics of the all-solid secondary battery 1 may not improve.

The charge capacity of the cathode active material layer 12 may be obtained by multiplying a weight of the cathode active material in the cathode active material layer 12 by a charge capacity density (mAh/g) of the cathode active material. When various types of materials are used as the cathode active material, a value of a charge capacity density times a weight of each of the cathode active materials is calculated, and the total of these values is a charge capacity of the cathode active material layer 12. A charge capacity of the anode active material layer 22 may be calculated in the same manner. That is, a charge capacity of the anode active material layer 22 is obtained by multiplying a weight of the anode active material in the anode active material layer 22 by a charge capacity density (mAh/g) of the anode active material. When various types of materials are used as the anode active material, a value of a charge capacity density times a weight of each of the anode active materials is calculated, and the total of these values is a charge capacity of the anode active material layer 22. Here, the charge capacity densities of the cathode active material and the anode active material are capacities estimated using an all-solid half-cell in which lithium metal is used as a reference electrode. The charge capacity densities of the cathode active material layer 12 and the anode active material layer 22 are directly measured by using an all-solid half-cell. When the measured charge capacity is divided by a weight of each of the active materials, a charge capacity density may be obtained. In an embodiment, the charge capacities of the cathode active material layer 12 and the anode active material layer 22 may be initial charge capacities measured in the 1st charging cycle.

Referring to FIG. 6, an all-solid secondary battery 1 may include, for example, an anode current collector 21 and an anode active material layer 22, wherein the anode active material layer 22 is proximate to the solid electrolyte layer 30.

Referring to FIG. 7, an all-solid secondary battery 1a may further include, for example, a metal layer 23 disposed between an anode current collector 21 and an anode active material layer 22. The metal layer 23 may include lithium or a lithium alloy. Therefore, the metal layer 23 may, for example, function as a lithium reservoir. Examples of the lithium alloy may be at least one of a Li—Al alloy, a Li—Sn alloy, a Li—In alloy, a Li—Ag alloy, a Li—Au alloy, a Li—Zn alloy, a Li—Ge alloy, or a Li—Si alloy, but embodiments are not limited thereto, and any suitable lithium alloy may be used. The metal layer 23 may be formed of one of these alloys or lithium or may be formed of various alloys.

A thickness of the metal layer 23 may be, for example, in a range of about 1 μm to about 1000 μm, about 2 μm to about 500 μm, about 3 μm to about 200 μm, about 4 μm to about 150 μm, about 5 μm to about 100 μm, or about 6 μm to about 50 μm, but embodiments are not limited thereto. When the thickness of the metal layer 23 is too thin, the metal layer 23 may not function as a lithium reservoir. When the thickness of the metal layer 23 is too thick, a weight and a volume of the all-solid secondary battery 1 may increase, and cycle characteristics may be deteriorated. The metal layer 23 may be, for example, a metal foil having a thickness in these ranges.

In the all-solid secondary battery 1a, the metal layer 23 may be disposed between the anode current collector 21 and the anode active material layer 22 before assembling the all-solid secondary battery 1a or may be precipitated between the anode current collector 21 and the anode active material layer 22 after assembling the all-solid secondary battery 1a. When the metal layer 23 is disposed between the anode current collector 21 and the anode active material layer 22 before assembling the all-solid secondary battery 1a, the metal layer 23 includes lithium and thus may function as a lithium reservoir. For example, a lithium foil is disposed between the anode current collector 21 and the anode active material layer 22 before assembling the all-solid secondary battery 1a. In this regard, cycle characteristics of the all-solid secondary battery 1a including the metal layer 23 may further improve. When the metal layer 23 is precipitated by charging after assembling the all-solid secondary battery 1a, an energy density of the all-solid secondary battery 1a increases due to not including the metal layer 23 during the assembly of the all-solid secondary battery 1*a*. For example, the all-solid secondary battery 1*a* may be charged over a charge capacity of the anode active material layer 22. That is, the anode active material layer 22 is overcharged. In the beginning of the charge, lithium is absorbed in the anode active material layer 22. The anode active material in the anode active material layer 22 may form an alloy or a compound with lithium ions migrated from the cathode layer 10. When the anode active material layer is charged over its capacity, for example, lithium is precipitated on a back surface of the anode active material layer 22, which is between the anode current collector 21 and the anode active material layer 22, and a metal layer corresponding to the metal layer 23 may be formed by the precipitated lithium. The metal layer 23 is a metal layer mainly formed of lithium (i.e., metal lithium). This results because, for example, the anode active material in the anode active material layer 22 is formed of a material capable of forming an alloy or a compound with lithium. In the discharge, lithium of the anode active material layer 22 and the metal layer 23, that is a metal layer, is ionized and migrated in a direction to the cathode layer 10. Thus, lithium may be used as an anode active material in the all-solid secondary battery 1*a*. Also, since the anode active material layer 22 covers the metal layer 23, the anode active material layer 22 serves as a protection layer of the metal layer 23 and suppresses precipitation growth of lithium dendrite at the same time. Thus, short-circuit and capacity deterioration of the all-solid secondary battery 1*a* may be suppressed, and as a result, cycle characteristics of the all-solid secondary battery 1*a* may improve. Also, when the metal layer 23 is formed by charging after the assembling of the all-solid secondary battery 1*a*, the anode current collector 21, the anode active material layer 22, and a region therebetween are, for example, Li-free regions not including lithium in the initial state or an after-discharge state of the all-solid secondary battery 1*a*.

The anode current collector 21 may be formed of, for example, a material that does not react with lithium, i.e., does not form both an alloy and a compound. Examples of the material forming the anode current collector 21 may include at least one of copper (Cu), stainless steel, titanium (Ti), iron (Fe), cobalt (Co), or nickel (Ni), but embodiments are not limited thereto, and any suitable electrode current collector may be used. The anode current collector 21 may be formed of one metal, an alloy, or a coating material comprising at least two metals. The anode current collector 21 may be, for example, in the form of a plate or a foil.

The all-solid secondary battery 1 may include, for example, a thin film including an element alloyable with lithium on the anode current collector 21 The thin film is disposed between the anode current collector 21 and the anode active material layer 22. The thin film includes, for example, an element alloyable with lithium. Examples of the element alloyable with lithium may include gold, silver, zinc, tin, indium, silicon, aluminum, or bismuth, but embodiments are not limited thereto, and any suitable element that is alloyable with lithium may be used. The thin film is formed of any of these metals or alloys of various metals. When the thin film is disposed on the anode current collector 21, for example, the precipitation form of the metal layer 23 precipitated between the thin film and the anode active material layer 22 may be further flattened, and thus cycle characteristics of the all-solid secondary battery 1 may further improve.

A thickness of the thin film may be, for example, in a range of about 1 nm to about 800 nm, about 10 nm to about 700 nm, about 50 nm to about 600 nm, or about 100 nm to about 500 nm. When the thickness of the thin film is less than 1 nm, the thin film may not function as a lithium reservoir. When the thickness of the thin film is too thick, the thin film itself absorbs lithium, and a precipitation amount of lithium in an anode may decrease, which results in deterioration of an energy density of the all-solid battery, and thus cycle characteristics of the all-solid secondary battery 1 may be deteriorated. The thin film may be disposed on the anode current collector 21 by using, for example, vacuum vapor deposition, sputtering, or plating, but embodiments are not limited thereto, and any suitable method capable of forming a thin film may be used.

According to an embodiment, a method of preparing a solid ion conductor compound may include contacting a compound including lithium, a compound including the element Hf, a compound including the element phosphorus (P), and a compound including the element sulfur (S) to provide a mixture; and heat-treating the mixture at a temperature of about 400° C. to about 700° C. in an atmosphere comprising an inert gas, for about 1 hour to about 36 hours, to provide a solid ion conductor compound. The solid ion conductor compound includes the elements Li, P, Hf, and S and does not include the element O, wherein a part of the P is substituted with Hf in a crystal structure of the solid ion conductor compound. For example, the solid ion conductor compound is a compound represented by Formula 1.

The compound including lithium may include a sulfide including lithium. An example of the sulfide including lithium may be a lithium sulfide.

The compound including the element Hf may include a sulfide including Hf. An example of the sulfide including the element Hf may be a hafnium sulfide.

The compound including the element phosphorus (P) may include a sulfide including phosphorus. An example of the sulfide including the element phosphorus may be $P_2S_5$.

The compound including a Group 17 element includes a lithium salt including a Group 17 element. Examples of the lithium salt including a Group 17 element may be LiCl, LiF, LiBr, or LiI.

A N-containing compound, for example, a nitride of hafnium or phosphorus may be added to the mixture.

The compound may be prepared by contacting starting materials at appropriate amounts, for example, stoichiometric amounts to prepare a mixture; and heat-treating the mixture. Examples of the contacting of the starting materials may be milling such as ball-milling or pulverization.

The mixture may further include a compound including at least one of a Group 1 element, a Group 2 element, a Group 4 element, a Group 5 element, a Group 6 element, a Group 11 element, a Group 14 element, or a Group 15 element, in addition to Li, P, Hf, and S. Examples of the compound may be $Na_2S$ or $K_2S$.

The mixture prepared by mixing the precursors at a stoichiometric composition may be heat-treated in an inert atmosphere or vacuum to prepare a solid ion conductor compound.

The heat-treating of the mixture may be performed at a temperature, for example, in a range of about 400° C. to about 700° C., about 410° C. to about 650° C., about 420° C. to about 600° C., about 430° C. to about 550° C., or about 440° C. to about 500° C. The heat-treating may be performed for, for example, about 1 hour to about 36 hours, about 2 hours to about 30 hours, about 4 hours to about 24 hours, about 10 hours to about 24 hours, or about 16 hours to about 24 hours. The inert atmosphere is an atmosphere including an inert gas. Examples of the inert gas may be nitrogen or argon, but embodiments are not limited thereto, and suitable inert gas may be used.

Hereinafter, embodiments will be described in further detail with reference to the following examples. These examples are provided for illustrative purposes only and are not intended to limit the scope of the present inventive concepts.

EXAMPLES

Preparation of Solid Ion Conductor Compound

Example 1: Preparation of $Li_{5.85}P_{0.9}Hf_{0.1}S_{4.75}Cl_{1.25}$

In a glove box of an argon (Ar) atmosphere, $Li_2S$ as a lithium precursor, $P_2S_5$ as a phosphorus precursor, LiCl as a chlorine precursor, and $HfCl_4$ as a hafnium precursor were mixed at a stoichiometric ratio to obtain a desired composition of $Li_{5.85}P_{0.9}Hf_{0.1}S_{4.75}Cl_{1.25}$, and the resultant was pulverized and mixed in a planetary ball mill of an Ar atmosphere including zirconia balls (YSZ) at a rate of 100 rpm for 1 hour, and then subsequently pulverized and mixed at 800 rpm for 30 minutes to obtain a mixture. Thus obtained mixture was pressed with a uniaxial pressure to prepare a pellet having a thickness of about 10 mm and a diameter of about 13 mm. The pellet thus prepared was coated with a gold film and placed into a carbon furnace, and the carbon furnace was vacuum-sealed by using a quartz glass tube. A temperature of the vacuum-sealed pellet was increased from room temperature to 500° C. using an electric furnace at a rate of 1.0° C./min, heat-treated at 500° C. for 12 hours, and then cooled to room temperature at a rate of 1.0° C./min to obtain a solid ion conductor compound. A composition of the solid ion conductor compound thus obtained was $Li_{5.85}P_{0.9}Hf_{0.1}S_{4.75}Cl_{1.25}$.

Example 2: Preparation of $Li_{5.95}P_{0.8}Hf_{0.2}S_{4.5}Cl_{1.25}$

A solid ion conductor compound was prepared in the same manner as in Example 1, except that a stoichiometric mixing ratio of the starting materials was changed to obtain a desired composition, $Li_{5.95}P_{0.8}Hf_{0.2}S_{4.5}Cl_{1.25}$.

A composition of the solid ion conductor compound thus obtained was $Li_{5.95}P_{0.8}Hf_{0.2}S_{4.5}Cl_{1.25}$.

Example 3: Preparation of $Li_{5.6}P_{0.9}Hf_{0.1}S_{4.5}Cl_{1.5}$

A solid ion conductor compound was prepared in the same manner as in Example 1, except that a stoichiometric mixing ratio of the starting materials was changed to obtain a desired composition, $Li_{5.6}P_{0.9}Hf_{0.1}S_{4.5}Cl_{1.5}$.

A composition of the solid ion conductor compound thus obtained was $Li_{5.6}P_{0.9}Hf_{0.1}S_{4.5}Cl_{1.5}$.

Example 4: Preparation of $Li_{5.6}P_{0.9}Hf_{0.1}S_{4.5}Cl_{0.5}Br_1$

A solid ion conductor compound was prepared in the same manner as in Example 1, except that LiBr was added and a stoichiometric mixing ratio of the starting materials was changed to obtain a desired composition, $Li_{5.6}P_{0.9}Hf_{0.1}S_{4.5}Cl_{0.5}Br_1$.

A composition of the solid ion conductor compound thus obtained was $Li_{5.6}P_{0.9}Hf_{0.1}S_{4.5}Cl_{0.5}Br_1$.

Comparative Example 1: Preparation of $Li_{5.85}PS_{4.85}Cl_{1.15}$

A solid ion conductor compound was prepared in the same manner as in Example 1, except that the Hf precursor was not added and a stoichiometric mixing ratio of the starting materials was changed to obtain a desired composition, $Li_{5.85}PS_{4.85}Cl_{1.15}$. A composition of the solid ion conductor compound thus obtained was $Li_{5.85}PS_{4.85}Cl_{1.15}$.

Comparative Example 2: Preparation of $Li_{5.5}PS_{4.5}Cl_{0.75}Br_{0.75}$

A solid ion conductor compound was prepared in the same manner as in Example 1, except that the Hf precursor was not added, LiBr was added, and a stoichiometric mixing ratio of the starting materials was changed to obtain a desired composition, $Li_{5.5}PS_{4.5}Cl_{0.75}Br_{0.75}$. A composition of the solid ion conductor compound thus obtained was $Li_{5.5}PS_{4.5}Cl_{0.75}Br_{0.75}$.

Comparative Example 3: Preparation of $Li_{5.85}P_{0.9}Hf_{0.1}S_{4.65}O_{0.1}Cl_{1.25}$ A solid ion conductor compound was prepared in the same manner as in Example 1, except that the Hf precursor was not added, $Li_2O$, instead of $Li_2S$, was added with respect to an amount of 0, and a stoichiometric mixing ratio of the starting materials was changed to obtain a desired composition, $Li_{5.85}P_{0.9}Hf_{0.1}S_{4.65}O_{0.1}Cl_{1.25}$. A composition of the solid ion conductor compound thus obtained was $Li_{5.85}P_{0.9}Hf_{0.1}S_{4.65}O_{0.1}Cl_{1.25}$.

Example 5: Preparation of all-Solid Secondary Battery

Preparation of Cathode Layer $LiNi_{0.8}Co_{0.15}Al_{0.05}O_2$(NCA) was prepared as a cathode active material. A sulfide-based solid electrolyte powder prepared in Example 1 was prepared as a solid electrolyte. Carbon nanofibers (CNFs) were prepared as a conducting agent. The cathode active material, solid electrolyte, and conducting agent were mixed at a weight ratio of 60:35:5 to prepare a cathode mixture.

Preparation of Solid Electrolyte Powder

The sulfide-based solid ion conductor compound prepared in Example 1 was pulverized using an agate mortar and used as a solid electrolyte powder.

Preparation of Anode Layer

A metal lithium foil having a thickness of about 30 μm was prepared as an anode.

Preparation of all-Solid Secondary Battery

After sequentially stacking a lithium metal foil having a thickness of about 30 μm, 150 mg of the solid electrolyte powder, and 15 mg of the cathode mixture on the stainless steel (SUS) lower electrode in the stated order, the SUS upper electrode was disposed on the cathode mixture to prepare a stack. Then, thus prepared stack was pressed at a pressure of about 4 ton/cm² for about 2 minutes. Subsequently, the pressed stack was pressed at a torque of about 4 Nm using a torque wrench to prepare an all-solid secondary battery.

In the prepared all-solid secondary battery, the solid electrolyte was stable without being decomposed by the lithium metal anode.

Example 6

An all-solid secondary battery was prepared in the same manner as in Example 5, except that the solid electrolyte powder prepared in Example 4 was used instead of the solid electrolyte powder prepared in Example 1.

Comparative Examples 4 and 5

All-solid secondary batteries were prepared in the same manner as in Example 5, except that the solid electrolyte powders prepared in Comparative Examples 1 and 2 were each respectively used instead of the solid electrolyte powder prepared in Example 1.

Evaluation Example 1: X-Ray Diffraction Test

The solid ion conductor compounds prepared in Examples 1 to 4 were pulverized using an agate mortar to prepare powders, and the powders were used in the measurement of powder XRD spectrum. A part of the results is shown in FIG. 1. Cu Kα radiation was used in the XRD spectrum measurement. It was confirmed that the solid ion conductor compounds of Examples 1 to 4 still had argyrodite crystal structures.

Evaluation Example 2: Atmospheric Stability Evaluation

Figure 2:
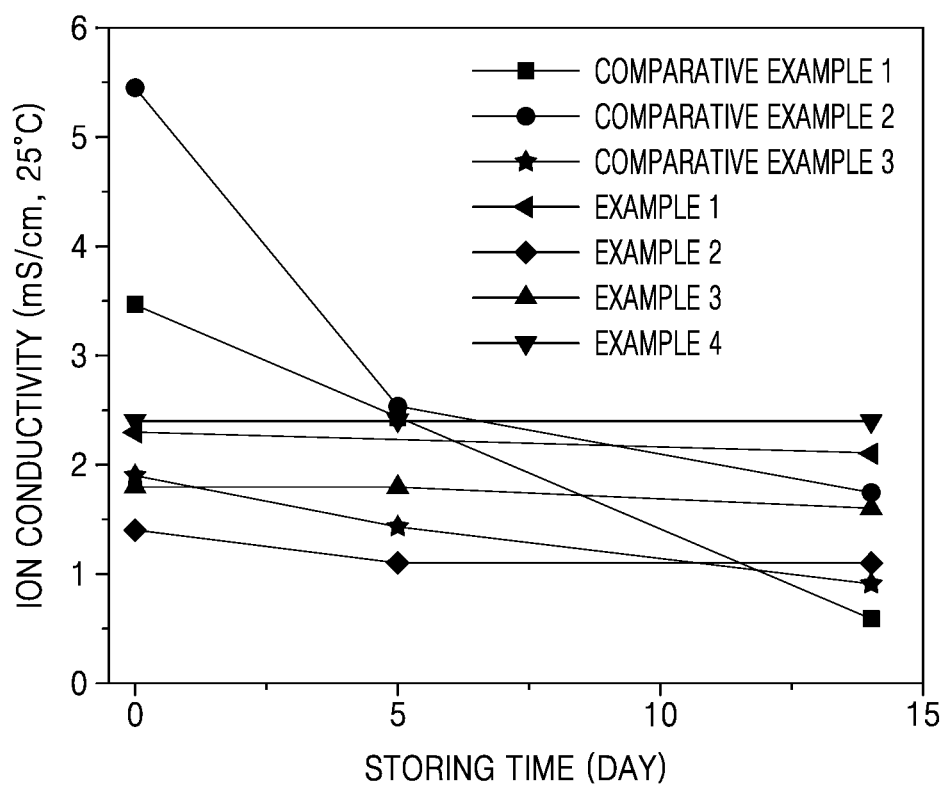
FIG. 2 is a graph of ion conductivity (millisiemens per centimeter (mS/cm) at 25° C.) versus storing time (days) of solid ion conductor compounds prepared in Examples 1 to 4 and Comparative Examples 1 and 2.

The solid ion conductor compounds prepared in Examples 1 to 4 and Comparative Examples 1 to 3 were pulverized using an agate mortar to prepare powders, and the powders were stored in a dry room of the air atmosphere having a dew point of lower than about −40° C. for 5 days and 14 days and then were removed from the dry room to measure changes in ion conductivity. The change in ion conductivity was calculated by using an ion conductivity retention of Equation 1. The measurement results are shown in Table 1 and FIG. 2. Initial ion conductivities are ionic conductivities of the prepared powders before being stored in the dry room. The measurement of ion conductivity was performed in the same manner under the same conditions in Evaluation Example 1.

Ion conductivity retention (%)=[Ion conductivity of solid ion conductor compound (after 5 days or 14 days)/initial ion conductivity of solid ion conductor compound]×100     Equation 1

TABLE 1

|  | Ion conductivity retention after 5 days [%] | Ion conductivity retention after 14 days [%] |
| --- | --- | --- |
| Example 1 | 93.6 | 91.3 |
| Example 2 | 78.6 | 78.6 |
| Example 3 | 100 | 88.9 |
| Example 4 | 100 | 100 |
| Comparative Example 1 | 70.3 | 17.0 |
| Comparative Example 2 | 46.6 | 32.1 |
| Comparative Example 3 | 75.5 | 48.1 |

As shown in Table 1, the solid ion conductor compounds of Examples 1 to 4 had improved ion conductivity retention compared to those of the solid ion conductor compounds of Comparative Examples 1 to 3.

The solid ion conductor compound of Example 4 had an ion conductivity retention of about 100% after 14 days, whereas the solid ion conductor compounds of Comparative Examples 1 and 2 had ion conductivity retention of about 32% or less after 14 days, and in the case of the solid ion conductor compound of Comparative Example 3 in which oxygen was additionally substituted had an ion conductivity retention of about 48.1%.

Evaluation Example 3: Charge/Discharge Test and Interfacial Stability Evaluation Charge/discharge characteristics of the all-solid secondary batteries prepared in Examples 5 and 6 and Comparative Examples 4 and 5 were evaluated according to the following charge/discharge test. The charge/discharge test was performed by placing the all-solid secondary batteries in a chamber at a temperature of about 45° C.

In the first cycle, the batteries were charged with a constant current of about 0.1 C until the battery voltage was about 4.25 V and with a constant voltage of about 4.25 V until the current was 0.05 C. Subsequently, the batteries were discharged with a constant current of about 0.1 C until the battery voltage was about 2.5 V. A discharge capacity of the first cycle was used as a standard capacity.

In the second cycle, the batteries were charged with a constant current of about 0.1 C until the battery voltage was about 4.25 V and with a constant voltage of about 4.25 V for about 40 hours. Subsequently, the batteries were discharged with a constant current of about 0.1 C until the battery voltage was about 2.5 V. A discharge capacity of the second cycle was used as a retention capacity.

In the third cycle, the batteries were charged with a constant current of about 0.1 C until the battery voltage was about 4.25 V and with a constant voltage of about 4.25 V for about 40 hours. Subsequently, the batteries were discharged with a constant current of about 0.1 C until the battery voltage was about 2.5 V. A discharge capacity of the third cycle was used as a recovery capacity.

10 minutes of retention time was set after every charge/discharge cycle.

Figure 3:
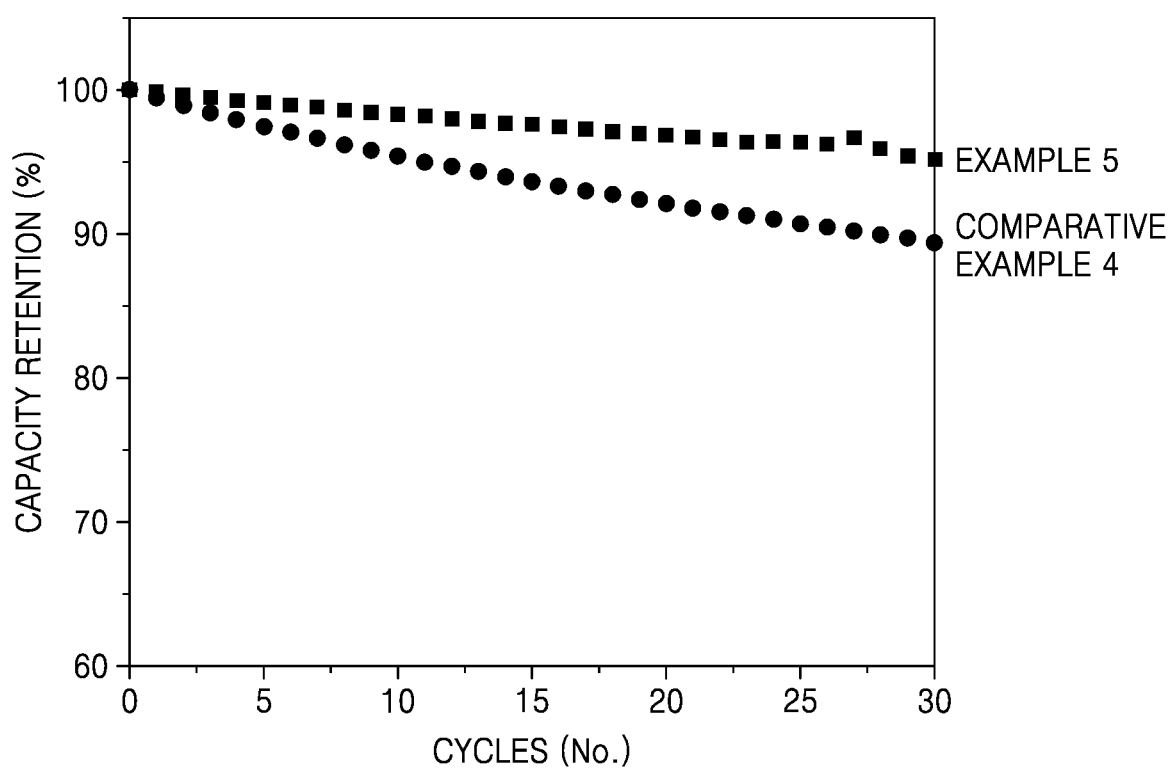
FIG. 3 is a graph of capacity retention (%) versus number of charge/discharge cycles (No.) of all-solid secondary batteries prepared in Example 5 and Comparative Example 3.

Capacity recovery percentages after storing at a high temperature and capacity retention after storing at a high temperature of the all-solid secondary batteries prepared in Examples 5 and 6 and Comparative Examples 4 and 5 are shown in Table 2. Also, a capacity retention graph with respect to Example 5 and Comparative Example 4 is shown in FIG. 3.

The capacity retention after storing at a high temperature and the capacity recovery after storing at a high temperature are defined as shown in Equations 2 and 3.

Retention capacity (%)=[Retention capacity/standard capacity]×100     Equation 2

Recovery capacity (%)=[Recovery capacity/standard capacity]×100     Equation 3

TABLE 2

|  | Retention capacity [%] | Recovery capacity [%] |
| --- | --- | --- |
| Example 5 | 101.2 | 99.1 |
| Example 6 | 102.3 | 100.2 |
| Comparative Example 4 | 97.3 | 86.0 |
| Comparative Example 5 | 89.0 | 88.2 |

As shown in Table 2, the all-solid secondary batteries of Examples 5 and 6 had improved capacity retention and capacity recovery after being stored in a charged state at a high temperature for a long period of time compared to those of the all-solid secondary batteries of Comparative Examples 4 and 5.

Evaluation Example 4: Charge/Discharge Test and Life Characteristics Evaluation

Life characteristics of the all-solid secondary batteries of Examples 5 and 6 and Comparative Examples 4 and 5 after the evaluation of Evaluation Example 3 were evaluated. The charge/discharge test was performed by placing the all-solid secondary batteries in a chamber of 45° C.

Figure 4:
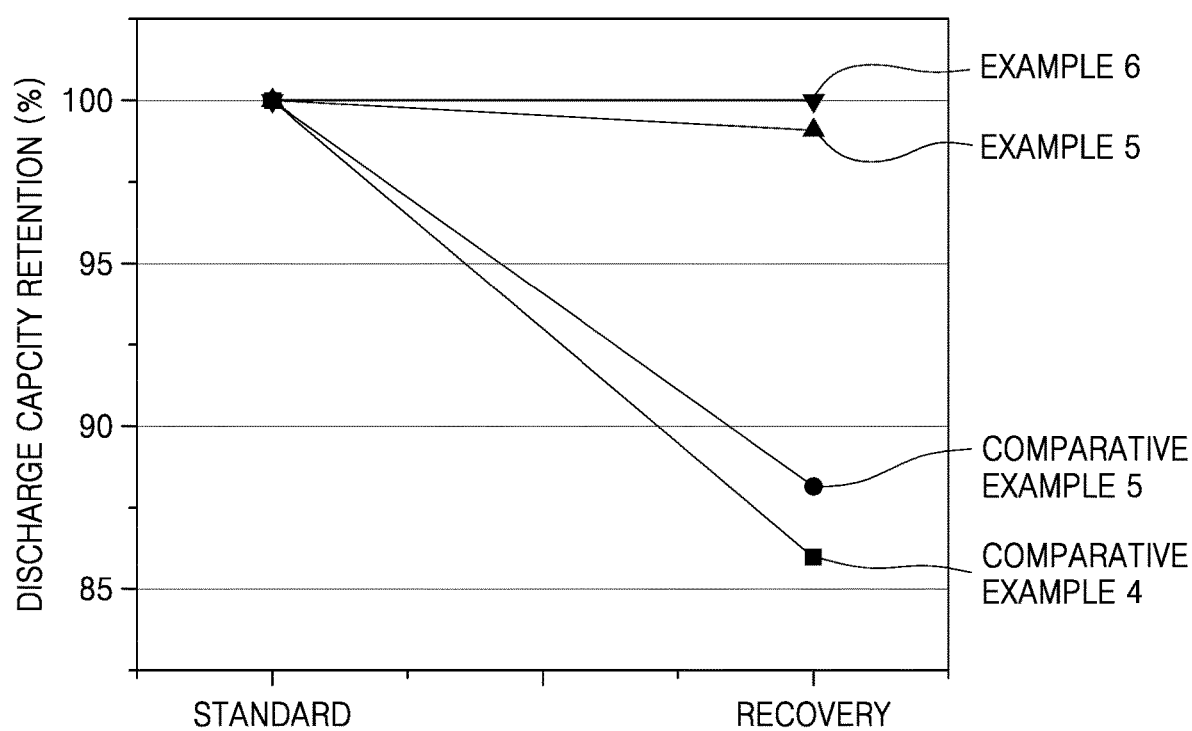
FIG. 4 is a graph of discharge capacity retention (%) that shows lifespan characteristics of all-solid secondary batteries prepared in Examples 5 and 6 and Comparative Example 3 and 4.

The batteries were charged with a constant current of about 0.1 C until the battery voltage was about 4.25 V and with a constant voltage of about 4.25 V until the current was about 0.05 C. Subsequently, the batteries were discharged with a constant current of about 0.1 C until the battery voltage was about 2.5 V. The charge/discharge cycle was repeated 10 times. 10 minutes of retention time was set after every charge/discharge cycle. Capacity retention of the all-solid secondary batteries prepared in Examples 5 and 6 and Comparative Examples 4 and 5 are shown in Table 3 and FIG. 4. The capacity retention is defined as shown in Equation 4.

Capacity retention (%)=[Discharge capacity of $10^{th}$ cycle/discharge capacity of $1^{st}$ cycle]×100   Equation 4

TABLE 3

|  | Capacity retention [%] |
|---|---|
| Example 5 | 98.6 |
| Example 6 | 98.4 |
| Comparative Example 4 | 87.1 |
| Comparative Example 5 | 95.8 |

As shown in Table 3, the all-solid secondary batteries of Examples 5 and 6 had improved high-temperature life characteristics due to having improved oxidation resistance and interfacial stability compared to those of the all-solid secondary batteries of Comparative Examples 4 and 5.

As described above, according to an aspect, when an electrochemical cell includes a solid ion conductor compound having improved lithium ion conductivity and stability with respect to lithium metal, the electrochemical cell may have improved stability and cycle characteristics.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid ion conductor compound comprising:
Li, P, Hf, and S;
wherein the solid ion conductor compound does not comprise O,
wherein the solid ion conductor compound has an argyrodite crystal structure, and
in the argyrodite crystal structure the Hf is on a portion of the P crystallographic sites.

2. The solid ion conductor compound of claim 1, wherein the solid ion conductor compound has diffraction peaks at 15.42° 2θ±0.50°, 17.87° 2θ±0.50°, 25.48° 2θ±0.50°, 30.01° 2θ±0.50°, and 31.38° 2θ±0.50°, when measured by X-ray diffraction using CuKα radiation.

3. The solid ion conductor compound of claim 1, further comprising at least one halogen element.

4. The solid ion conductor compound of claim 1, further comprising, in addition to the Li, the P, and the Hf, at least one of a Group 1 element, a Group 2 element, a Group 4 element, a Group 5 element, a Group 6 element, a Group 11 element, a Group 14 element, or a Group 15 element.

5. The solid ion conductor compound of claim 1, wherein the solid ion conductor compound is represented by Formula 1:

$$Li_a M1_b M2_c P_d Hf_e S_{6-f-g} N_g X_f$$   Formula 1 wherein, in Formula 1,
X is at least one of a Group 17 element,
M1 is at least one of a Group 1 element, a Group 2 element, or a Group 11 element, wherein M1 is not Li,
M2 is at least one of a Group 4 element, a Group 5 element, a Group 6 element, a Group 14 element, or a Group 15 element, wherein M2 is not Hf, N, or P, and
4≤a≤8, 0≤b<1, 0≤c<1, 0<d<1, 0<e<1, 0<f<5, and 0≤g<1.

6. The solid ion conductor compound of claim 5, wherein X is at least one of F, Cl, Br, or I.

7. The solid ion conductor compound of claim 5, wherein 1≤f<3.

8. The solid ion conductor compound of claim 5, wherein 0<e/(d+e)<0.5.

9. The solid ion conductor compound of claim 5, wherein M1 is at least one of Na, K, Rb, Cs, Fr, Mg, Ca, Sr, Ba, Ra, Cu, Ag, or Au.

10. The solid ion conductor compound of claim 5, wherein M2 is at least one of Si, Ge, As, Sb, Bi, Sn, Pb, V, Nb, Ta, Cr, Mo, W, Ti, or Zr.

11. The solid ion conductor compound of claim 5, wherein b=0 and c=0.

12. The solid ion conductor compound of claim 1, wherein the solid ion conductor compound is represented by Formula 2:

$$Li_{7+x-(v+y+z)} P_{1-x} Hf_x S_{6-(v+y+z)} N_v X1_y X2_z$$   Formula 2 wherein, in Formula 2,
X1 and X2 are each independently at least one of F, Cl, Br, or I, and
0<x≤0.5, 0<y<2, 0<z<2, and 0≤v<1.

13. The solid ion conductor compound of claim 12, wherein
X1 is Cl,
X2 is at least one of Cl or Br, and
0<y+z≤2.

14. The solid ion conductor compound of claim 1, wherein the solid ion conductor compound has an ion conductivity retention of about 40 percent to about 100 percent, when measured after 14 days under a dry air atmosphere having a dew point of less than −40° C.

15. The solid ion conductor compound of claim 1, wherein the solid ion conductor compound is represented by at least one of $Li_{7+x-y} P_{1-x} Hf_x S_{6-y} Cl_y$, $Li_{7+x-y} P_{1-x} Hf_x S_{6-y} Br_y$, $Li_{7+x-y} P_{1-x} Hf_x S_{6-y} I_y$, $Li_{7+x(y+z)} P_{1-x} Hf_x S_{6-y-z} Cl_y Br_z$, $Li_{7+x-(y+z)} P_{1-x} Hf_x S_{6-y-z} Cl_y I_z$, $Li_{7+x-(y+z)} P_{1-x} Hf_x S_{6-y-z} Br_y I_z$, $Li_{7+x-(v+z)} P_{1-x} Hf_x S_{6-(v+y)} N_v Cl_y$, $Li_{7+x-(v+y)} P_{1-x} Hf_x S_{6-(v+y)} N_v Br_y$, $Li_{7+x-(v+y)} P_{1-x}$ $Hf_xS_{6-(v+y)}N_vI_y$, $Li_{7+x-(v+y+z)}P_{1-x}Hf_xS_{6-(v+y+z)}N_vCl_yBr_z$, $Li_{7+x-(v+y+z)}P_{1-x}Hf_xS_{6-(v+y+z)}N_vCl_yI_z$, or $Li_{7+x-(v+y+z)}P_{1-x}Hf_xS_{6-(v+y+z)}N_vBr_yI_z$;

wherein in each of the foregoing formulas, x, y, z, and v are each independently $0<x\leq0.5$, $0<y<2$, $0<z<2$, and $0<v<1$.

16. The solid ion conductor compound of claim 1, wherein the solid ion conductor compound is at least one of $Li_{5.85}P_{0.9}Hf_{0.1}S_{4.75}Cl_{1.25}$, $Li_{5.95}P_{0.8}Hf_{0.2}S_{4.5}Cl_{1.25}$, $Li_{5.6}P_{0.9}Hf_{0.1}S_{4.5}Cl_{1.5}$, $Li_{5.85}P_{0.9}Hf_{0.1}S_{4.75}Br_{1.25}$, $Li_{5.95}P_{0.8}Hf_{0.2}S_{4.5}Br_{1.25}$, $Li_{5.6}P_{0.9}Hf_{0.1}S_{4.5}Br_{1.5}$, $Li_{5.85}P_{0.9}Hf_{0.1}S_{4.75}I_{1.25}$, $Li_{5.95}P_{0.8}Hf_{0.2}S_{4.5}I_{1.25}$, $Li_{5.6}P_{0.9}Hf_{0.1}S_{4.5}I_{1.5}$, $Li_{5.6}P_{0.9}Hf_{0.1}S_{4.5}Cl_{0.5}Br$, $Li_{5.6}P_{0.9}Hf_{0.1}S_{4.5}Cl_{0.5}I$, $Li_{5.6}P_{0.9}Hf_{0.1}S_{4.5}Br_{0.5}I$, $Li_{5.95}P_{0.9}Hf_{0.1}N_{0.1}S_{4.65}Cl_{1.25}$, $Li_{6.05}P_{0.8}Hf_{0.2}N_{0.1}S_{4.4}Cl_{1.25}$, or $Li_{5.7}P_{0.9}Hf_{0.1}N_{0.1}S_{4.4}Cl_{0.5}Br$.

17. A cathode active material layer comprising:
a cathode active material, and
the solid ion conductor compound of claim 1 on at least one surface of the cathode active material.

18. An electrochemical cell comprising:
a cathode layer comprising a cathode active material layer;
an anode layer comprising an anode active material layer; and
an electrolyte layer disposed between the cathode layer and the anode layer,
wherein at least one of the cathode active material layer or the electrolyte layer comprises the solid ion conductor compound of claim 1.

19. The electrochemical cell of claim 18, wherein the electrochemical cell is an all-solid secondary battery in which the combination of the cathode layer, the anode and the electrolyte layer have a vapor pressure of 0 atmosphere to about 2 atmospheres at 25° C.

20. The electrochemical cell of claim 18, wherein the anode active material layer comprises an anode active material and a binder,
wherein the anode active material comprises amorphous carbon and at least one of Au, Pt, Pd, Si, Ag, Al, Bi, Sn, or Zn.

21. The electrochemical cell of claim 18, further comprising a metal layer between the anode current collector and the anode active material layer, wherein the metal layer comprises lithium or a lithium alloy.

22. A method of preparing the solid ion conductor compound of claim 1, the method comprising:
contacting a compound comprising lithium, a compound comprising Hf, a compound comprising P, and a compound comprising S to provide a mixture; and
heat-treating the mixture at a temperature of about 400° C. to about 700° C. in an inert atmosphere to provide the solid ion conductor compound of claim 1.

23. The method of claim 22, wherein the heat-treating of the mixture is performed at a temperature in a range of about 420° C. to about 600° C. for about 1 hour to about 36 hours.

24. A solid electrolyte comprising:
a solid ion conductor compound represented by Formula 1, $$Li_aM1_bM2_cP_dHf_eS_{6-f-g}N_gX_f \qquad \text{Formula 1}$$

wherein, in Formula 1,
X is at least one of a Group 17 element,
M1 is at least one of a Group 1 element, a Group 2 element, or a Group 11 element, wherein M1 is not Li,
M2 is at least one of a Group 4 element, a Group 5 element, a Group 6 element, a Group 14 element, or a Group 15 element, wherein M2 is not Hf, N, or P, and
$4\leq a\leq 8$, $0\leq b<1$, $0\leq c<1$, $0<d<1$, $0<e<1$, $0<f<5$, and $0\leq g<1$; and
at least one of a lithium sulfide, a silicon sulfide, a phosphorus sulfide, or a boron sulfide.

25. The solid electrolyte according to claim 24, further comprising a binder, wherein the binder is at least one of styrene butadiene rubber, polytetrafluoroethylene, polyvinylidene fluoride, polyethylene, or polyvinyl alcohol.

* * * * *